(12) United States Patent
Jones et al.

(10) Patent No.: US 10,198,711 B2
(45) Date of Patent: Feb. 5, 2019

(54) METHODS AND SYSTEMS FOR MONITORING OR TRACKING PRODUCTS IN A RETAIL SHOPPING FACILITY

(71) Applicant: Walmart Apollo, LLC, Bentonville, AR (US)

(72) Inventors: Nicholaus A. Jones, Fayetteville, AR (US); Matthew A. Jones, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 15/883,275

(22) Filed: Jan. 30, 2018

(65) Prior Publication Data

US 2018/0247255 A1    Aug. 30, 2018

Related U.S. Application Data

(60) Provisional application No. 62/464,830, filed on Feb. 28, 2017.

(51) Int. Cl.
| | |
|---|---|
| *G06Q 30/06* | (2012.01) |
| *G06Q 10/08* | (2012.01) |
| *G06Q 10/06* | (2012.01) |
| *G06F 17/30* | (2006.01) |
| *G06T 7/90* | (2017.01) |

(Continued)

(52) U.S. Cl.
CPC ..... *G06Q 10/087* (2013.01); *G06F 17/30244* (2013.01); *G06K 7/1404* (2013.01); *G06Q 10/06311* (2013.01); *G06T 7/90* (2017.01); *G06K 9/00201* (2013.01)

(58) Field of Classification Search
CPC .............................. G06Q 30/06; G06Q 30/02
USPC .......................................................... 705/28
See application file for complete search history.

(56) References Cited

U.S. PATENT DOCUMENTS

| | | | |
|---|---|---|---|
| 6,850,252 B1 * | 2/2005 | Hoffberg | G06K 9/00369 348/E7.061 |
| 7,504,949 B1 | 3/2009 | Rouaix | |
| 7,957,565 B1 | 6/2011 | Sharma | |

(Continued)

OTHER PUBLICATIONS

PCT App. No. PCT/US18/15844; International Search Report and Written Opinion dated Apr. 13, 2018; 9 pages.

*Primary Examiner* — Oluseye Iwarere
(74) *Attorney, Agent, or Firm* — Fitch, Even, Tabin & Flannery LLP

(57) ABSTRACT

In some embodiments, apparatuses and methods are provided herein useful for a retail shopping facility to track products being shelved therein. In one example, this tracking is accomplished without the use of RFID tags and RFID readers, but instead, employs overhead electronic image capturing devices. By one approach, the images obtained are compared to a store planogram and alerts are sent to the associate or worker stocking the shelves to correct the stocking process. As the images may be captured and analyzed in real-time, the system may redirect the worker during the shelving process to prevent items from being stocked or shelved in an incorrect location for long. In one embodiment, the system includes a product database, overhead electronic image capturing devices, portable electronic devices, and a control circuit in communication with the product database, overhead electronic image capturing devices, and the portable electronic devices.

18 Claims, 6 Drawing Sheets

(51) Int. Cl.
*G06K 7/14* (2006.01)
*G06K 9/00* (2006.01)

(56) References Cited

U.S. PATENT DOCUMENTS

| | | |
|---|---|---|
| 8,694,443 B2 | 4/2014 | Bobbitt |
| 9,230,250 B1 | 1/2016 | Parker |
| 9,327,397 B1* | 5/2016 | Williams .................. B25J 3/00 |
| 9,436,770 B2 | 9/2016 | Hattrup |
| 2006/0032915 A1 | 2/2006 | Schwartz |
| 2010/0019905 A1 | 1/2010 | Boddie |
| 2011/0238516 A1* | 9/2011 | McAfee ............. G06Q 30/0185 |
| | | 705/26.1 |
| 2014/0003727 A1 | 1/2014 | Lortz |
| 2015/0029339 A1 | 1/2015 | Kobres |
| 2016/0350708 A1 | 12/2016 | Jones |
| 2016/0364758 A1* | 12/2016 | Achhra .............. G06Q 30/0261 |
| 2017/0004384 A1 | 1/2017 | Audo |
| 2018/0005312 A1* | 1/2018 | Mattingly ............... G06F 3/011 |
| 2018/0040044 A1* | 2/2018 | Mattingly ................ G06T 7/70 |

* cited by examiner

METHODS AND SYSTEMS FOR MONITORING OR TRACKING PRODUCTS IN A RETAIL SHOPPING FACILITY

CROSS-REFERENCE TO RELATED APPLICATION(S)

This application claims the benefit of U.S. Provisional Application No. 62/464,830, filed Feb. 28, 2017, which is incorporated by reference in its entirety herein.

TECHNICAL FIELD

This invention relates generally to monitoring retail items at a retail shopping facility.

BACKGROUND

Modern retail environments often look for ways to improve the customer experience, such as by providing convenient, ready access to retail products or items sold in the store. To that end, a retail shopping facility may find it advantageous to make locating products of interest easier for customers such as by having a directory posted or an accurate database of item locations that can be accessed to direct a customer to products of interest.

BRIEF DESCRIPTION OF THE DRAWINGS

Disclosed herein are embodiments of systems, apparatuses and methods pertaining to maintaining an accurate database of item locations and ensure proper stocking of products in the retail shopping facility. This description includes drawings, wherein.

Figure 1:
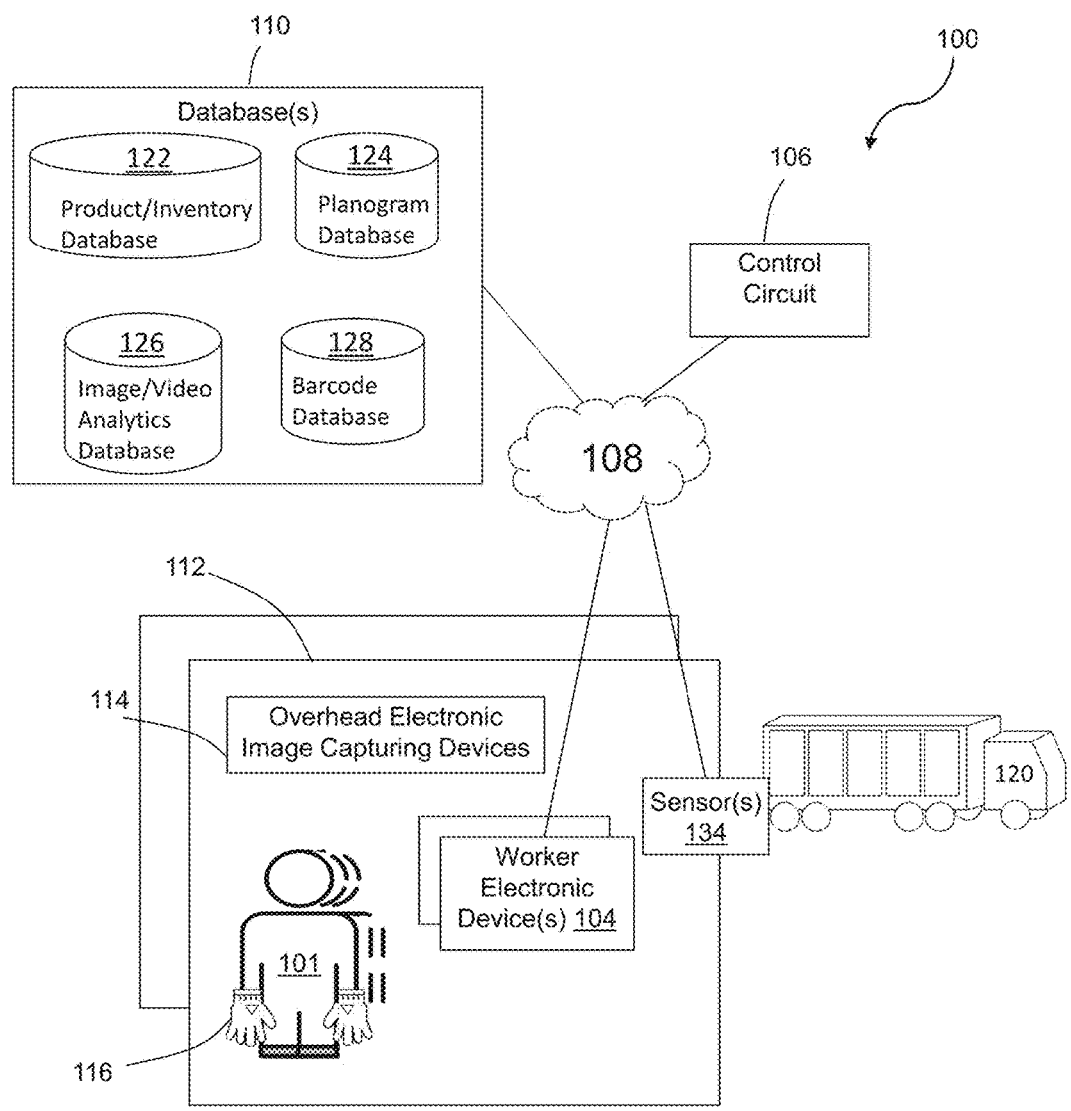
FIG. 1 is a simplified block diagram of an exemplary retail tracking system in accordance with some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to track products or merchandise being stocked and shelved in a physical retail facility to ensure the products are being shelved in their proper location according to aisle and shelf locations in a store planogram. In one example, this tracking is accomplished without requiring RFID tags and RFID readers, but instead, employs overhead electronic image capturing devices (which may be distributed throughout the store) to determine whether store employees or workers are stocking items in their proper location. The overhead electronic image capturing devices may track associates, employees, or workers who wear certain garments, such as shirts of a certain color, garments having particular indicia, or other distinguishing features, such that the employees are easily distinguished from customers. In addition to the particular garment, the workers also wear specialized gloves having markings that are particular to or individual to the associate wearing the gloves. For example, the specialized markings or indicia on the gloves may include dots, shapes, figures, or other markings printed in a pattern or specific location to identify the wearer of the gloves. In this way, when the gloves are identified and tracked by the image capturing devices, the location of the worker associated with those gloves is confirmed.

In addition to the location of the worker in a particular store aisle, the captured images also may indicate the height at which the worker is shelving the products, such that the control circuit can determine which shelf height is being stocked according to the height at which the hands are working. Accordingly, the system is configured to determine whether the worker is shelving the product on the shelf having a proper height and in the correct aisle.

In operation, the store associates may be course-corrected during the shelving operation, thereby helping the retail facility to retain products in their designated or intended location according to the planogram and preventing items from being shelved in the wrong location. Also, while other systems may help retain products in designated locations with RFID technology, such solutions can be costly and cumbersome.

In one illustrative approach, a retail product tracking system for automatically tracking products unloaded from a delivery vehicle and shelved in a retail store, include a product database of retail items, overhead electronic image capturing devices disposed in the physical retail facility, portable electronic devices carried by store workers or associates, and a control circuit. By one approach, the product database has aisle and/or shelf locations associated with at least some of the retail items, and a store planogram of intended aisle and/or shelf locations for retail items. The overhead electronic image capturing devices, in some embodiments, are configured to capture images of store associates or workers stocking shelves as they wear data gloves having markings associated with the particular worker wearing the gloves.

By one approach, the control circuit (which is in communication with the product database, the overhead electronic image capturing devices, and the electronic devices of the workers) is configured to correlate a particular product in the product database with a particular store worker at a dock area of the retail store, receive at least some captured images of the store aisles and associate the captured images received with an aisle of the retail store, and determine an updated shelving location of the particular product and the particular store worker by analyzing one of the received captured images and a location of the particular store worker along the aisle of the retail store. In such a configuration, the control circuit also compares the updated shelving location of the particular product with the store planogram, and upon determining that the updated shelving location of the particular product does not correspond to intended location information in the store planogram (i.e., the proper aisle and/or shelf location), sends an alert to the particular store worker, via the portable electronic device, that the particular product is not being shelved in its intended aisle and/or shelf location according to the store planogram. Accordingly, the control circuit can determine where a product is being shelved along an aisle and whether that location is the intended location pursuant to the store planogram.

In addition to having the control circuit determine whether the location of the product along the aisle is proper, the control circuit is further configured to determine whether the proper shelf height is being properly stocked with product. Accordingly, in some approaches, the control circuit analyzes the markings and a size of the markings on the data gloves to determine whether the particular store worker is stocking the particular product at a height corresponding to the intended shelf location for the particular retail product in the store planogram. Further, similar to the alerts mentioned above, the control circuit may send the worker electronic device a notice of improper shelving upon a determination that the height at which the particular product was being shelved does not correlate to the intended shelf location for the particular product in the store planogram. Thus, the control circuit may verify that the particular location along an aisle and a particular shelf height are being properly stocked with product.

In one illustrative approach, the overhead electronic image capturing devices capture images of multiple store aisles. In another approach, a single image capturing device captures a single store aisle. In yet another approach, a single store aisle may be monitored by multiple image capturing devices.

As noted above, the products herein are tracked to make sure they are shelved in their proper location according to the store planogram. Accordingly, the products may be tracked as soon as they are received at the retail facility in a delivery vehicle. For example, the products or boxes may be tracked as they are unloaded from the delivery truck. Accordingly, the system may include overhead electronic image capturing devices in a docki area. In one embodiment, the store worker unloading the boxes is wearing the data gloves having markings or other indicia thereon and the images may capture where the boxes are unloaded from the delivery vehicle (or pallet or conveyor) and where the particular associate deposits the box or product, e.g., a cart, another pallet, wagon, truck, or container. Further, the control circuit may store this information (i.e., the docking location of the product or box) in a product database. Further, the overhead image capturing devices, in one exemplary embodiment, will capture images of worker moving the product or boxes from the dock location to a retail floor location. The control circuit may further update the product database after the image capturing device has captured a worker removing the product from the dock area. In operation, the control circuit generally associates a particular store worker unloading a truck or stocking a shelf with the particular product being shelved, stocked, or otherwise moved.

In one example, the delivery vehicles received at the physical retail facility will have vehicle planograms or manifests associated therewith. In such configurations, the control circuit correlates the particular product in the product database with the particular store worker by analyzing a vehicle planogram received with an incoming shipment and a dock electronic image of the data gloves worn by the particular store worker. By one approach, the dock electronic image is captured by one of the overhead electronic image capturing devices located in or adjacent to the dock area.

In another example, the retail tracking system may employ a scanner, such as an optical scanner or barcode reader at a dock area to identify the particular product being unloaded from the delivery vehicle or moved in the dock area. This configuration is particularly helpful in situations where a truck planogram or manifest is not readily available. In some embodiments, the sensor, scanner, or barcode reader is disposed at an exit location of a delivery vehicle. Such a scanner or barcode reader may be configured to recognize a product being unloaded from the delivery vehicle (via a product barcode) and transmit the product barcode to the control circuit. Further, the barcode information can be correlated to the associate or worker identified in the captured image and this information may be updated in the product database. In operation, the control circuit correlates the particular product in the product database with the particular store worker by analyzing the dock electronic image captured by one of the overhead electronic image capturing devices located in the dock area and the product bar code transmitted from the barcode reader, and this correlation may be supplemented with information such as that obtained via the barcode reader or other sensor.

As outlined below, the aisles may include markings and other information to help the control circuit and/or image processing tools to determine the location of the products along the aisles. By one approach, the markings are disposed every couple of yards or feet from one another. In one illustrative example, the database of retail items and the aisle locations notes product placement information within a four-foot area.

Many retail facilities have overhead cameras disposed therein for loss prevention purposes. These are generally inexpensive cameras that capture images at predetermined periods of time. These images may undergo post-capturing processing to extract needed information. Further, any captured images without having workers therein may be discarded. In one illustrative approach, the overhead electronic image capturing devices may be programmed to take or capture images when workers having the particular garment are disposed within the frame or aisle. Further, captured images of insufficient quality also may be discarded (e.g., images where the workers are obscured from view), and this may occur before or after the captured images are transferred from the image capturing device.

In one illustrative approach, the overhead electronic image capturing devices include a memory configured to store at least some of the electronic images taken by a camera of the overhead electronic image capturing device and a power storage device. In addition, the electronic image capturing devices may further include a transmitter configured to transmit at least some of the captured images to at least one of the control circuit, the product database, or a central computer. The overhead electronic image capturing devices may be distributed throughout the retail store such that substantially all of the store aisles are within a camera view of at least one of the overhead electronic image capturing devices.

As suggested above, to facilitate distinguishing between the retail workers, employees, or associates stocking the shelves and the customer pulling product from the shelves, the store workers may wear a particular garment to identify them such that the control circuit and/or image processing tools are able to distinguish the workers from other individuals in the captured images. In this way, the store workers are identified by both the data gloves and the particular color garment to distinguish the store workers from customers.

The system described herein monitors the location of a particular worker, determines whether the product being stocked by the particular worker is being disposed in the proper location, and initiates corrective action if the worker associate is stocking the product incorrectly. In operation, a method for tracking retail products typically includes maintaining a product database of retail items, aisle and/or shelf locations associated with at least some of the retail items, and a store planogram of intended aisle and shelf locations for the retail items and capturing (via overhead electronic image capturing devices disposed in a retail store) images of store workers stocking shelves in the retail store and data gloves worn by the store workers. Further, the method includes correlating a particular product being shelved or moved with a particular store worker in the product database and this may occur when the worker initially contacts the product, such as at the dock area.

The method also uses the captured images to determine where the worker has moved the particular product after the dock area. In this manner, the method has associated the captured images received from the image capturing devices with an aisle of the retail store. As discussed below, this can occur by having the aisle include identifying information or possibly by assigning the captured image a file name identifying the aisle location, which may be generated by the image capturing device before the image is transferred to a control circuit or central computer. Accordingly, the method may include associating at least some of the captured images with an aisle of the retail store.

In operation, the method of tracking described herein typically includes analyzing one of the captured images of the store workers stocking shelves and the data gloves worn by the store worker, determining an updated shelving location of the particular product and the particular store worker along the aisle of the retail store, and comparing the updated shelving location of the particular product with the store planogram. Further, upon determining that the updated shelving location of the particular product does not correspond to the intended aisle and/or shelf location of the particular product in the store planogram, the method generally sends an alert or notice to the particular store worker, via a worker electronic device, that the particular product is not being shelved in its intended aisle location according to the store planogram. In some configurations, the alert is issued to the store worker while they are working to shelve the product such that the shelving operation can be interrupted and the product moved to its proper location. In this manner, the alert or notice may include information about the intended location of the item according to the store planogram. Further, the electronic device may provide the worker the opportunity to update the store planogram if the product is now to be shelved in the updated, shelving location.

In addition to analyzing the location of the worker shelving the product along the aisle, the markings or indicia on the gloves may be analyzed to determine whether the products are being placed at the proper height on the shelf. Accordingly, in some configurations, the method includes analyzing a size (and possibly configuration or perspective) of the markings on the data gloves to determine whether the particular store worker is stocking the particular product at a height corresponding to the intended shelf location for the particular retail product in the store planogram.

FIG. 1 illustrates a simplified block diagram of an exemplary retail stock tracking system 100, according to some embodiments, which facilitates tracking products to ensure the products are being shelved or stocked in their proper location. In this way, the retail shopping facility may ensure that the store planogram is being closely followed or updated when changes are intended to be made. The retail product tracking system 100 monitors products as they are unloaded from a delivery vehicle, moved through a dock area and store floor, and shelved in a retail store or facility. By one approach, the system 100 includes a control circuit 106, one or more databases 110, overhead electronic image capturing devices 114, and worker electronic devices 104 that may be portable.

In some embodiments, the database(s) 110 may include a product or inventory database 122 that includes retail item identifiers, aisle and/or shelf locations associated with the retail items, and a store planogram that denotes intended aisle (and possibly shelf) locations for at least some of the retail items. In some configurations, the planogram may be stored in a planogram database 124 and may be accessible to the product/inventory database 122.

The overhead electronic image capturing devices 114 (which may include a camera) are capable of capturing images of store aisles and individuals within the aisles including store associates or workers stocking shelves in the retail store. These associates or workers typically wear data gloves 116 with markings thereon associated with the particular associate wearing the data gloves. The captured images are usable to determine a location of the store worker shelving product in the aisle. In one exemplary approach, the captured images are analyzed to determine at which height the worker is shelving the product.

In addition, the overhead image capturing device 114 may include a memory configured to store at least some of the captured electronic images until they are transferred to a central computer, control circuit, or database and a power storage device configured to store electrical energy sufficient to periodically capture electronic images, store at least some of the electronic images, and possibly transfer the images. Accordingly, the electronic image capturing devices 114 also may include a transmitter configured to transmit at least some of the captured images to a control circuit, the product database, or a central computer. A number of overhead electronic image capturing devices 114 may be distributed throughout the retail facility such that substantially all of the store aisles are within view of a camera or image capturing device. In one illustrative approach, a single image capturing device 114 captures more than one aisle, such as, for example 2-3 aisles. By one approach, the overhead electronic image capturing devices 114 are mounted onto or extend from a ceiling of the retail facility.

As used herein, the worker electronic device(s) 104 may be portable and configured to send and receive information from the control circuit. For example, the worker electronic device carried by store workers may receive a notice or alert that the worker carrying the device is improperly shelving a product or not placing the product in the proper location, as described above. In addition, the worker electronic device 104, in some configurations, also may permit the worker to update the planogram, such as that in the product or inventory database 122 or the planogram database 124. By one approach, the portable worker electronic device 104 may include, for example, a smartphone or another handheld personal device. Further, the portable electronic device typically has battery power and transmission capabilities.

The control circuit 106 is in communication with the databases 110 and the retail facility 112. As illustrated in FIG. 1, the various devices of system 100 may communicate directly or indirectly, such as over one or more distributed communication networks, such as network 108, which may include, for example, LAN, WAN, Internet, cellular, Wi-Fi, and other such communication networks or combinations of two or more of such networks.

By one approach, the control circuit 106 is configured to correlate a particular product in the product database with a particular store worker, receive captured images of the store aisles and associate the captured images received with an aisle of the retail store, and determine an updated, shelving location of the particular product. This updated or shelving location is obtained by analyzing a captured image of the aisle location where the particular store worker associated with the particular product is shelving the product. With this information, the control circuit 106 compares the updated, shelving location of the particular product with the store planogram and sends an alert or notice to the worker shelving or stocking the product if the product is being shelved in a location that is inconsistent with the information in the store planogram. This notification or alert may be sent automatically upon the determination that the stocking activity is not in accordance with the store planogram.

Figure 2:
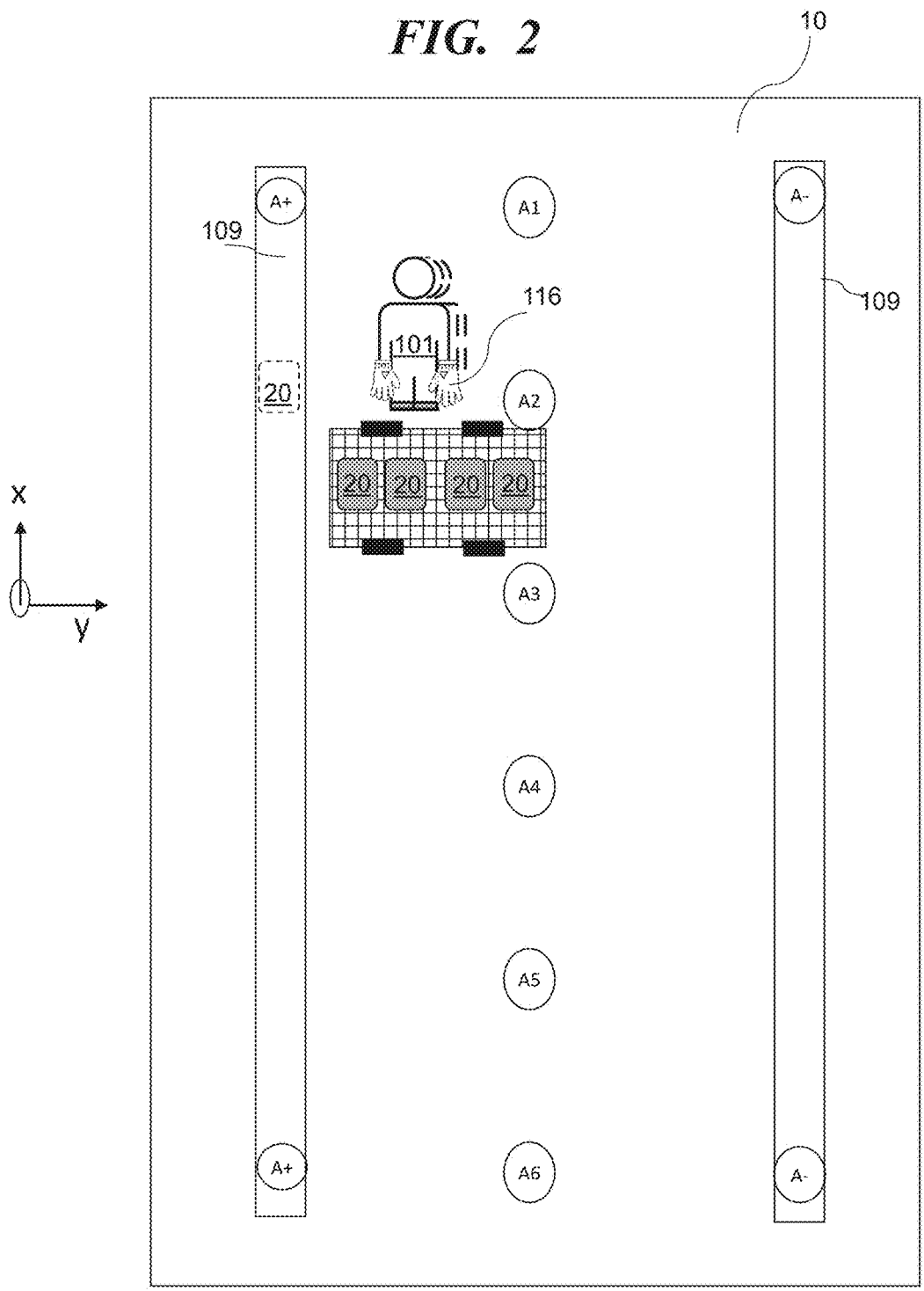
FIG. 2 is a schematic example of an image captured of a store aisle.

FIG. 2 illustrates a captured image 10 with a worker 101 shelving product 20 along an aisle 109 having a first side A+ and a second side A- and markers A1 through A6 along the length of the aisle 109. The captured image 10 of the aisle 109 obtained by the overhead electronic image capturing devices 114 shows the worker 101, the data gloves 116 worn by the worker, and possibly the product 20 (though as described above, the product and worker are typically correlated with one another at the dock area closer to an optical scanner 134 or the delivery vehicle 120, which may have a manifest or vehicle planogram associated therewith). As can be seen from the captured image 10, the worker 101 appears to be shelving a product 20 at location A2 along the aisle 109 at side A+. Even if the overhead image capturing device 114 cannot determine that it is product 20 being shelved, the markings or indicia 116 on the gloves indicate that it is worker 101 shelving product and the particular product 20 and the worker 101 were correlated with one another at the dock area, as described above. Further, to determine the shelf location or height at which the product is being shelved the markings on the gloves 116 can be analyzed in the captured image.

Figure 4:
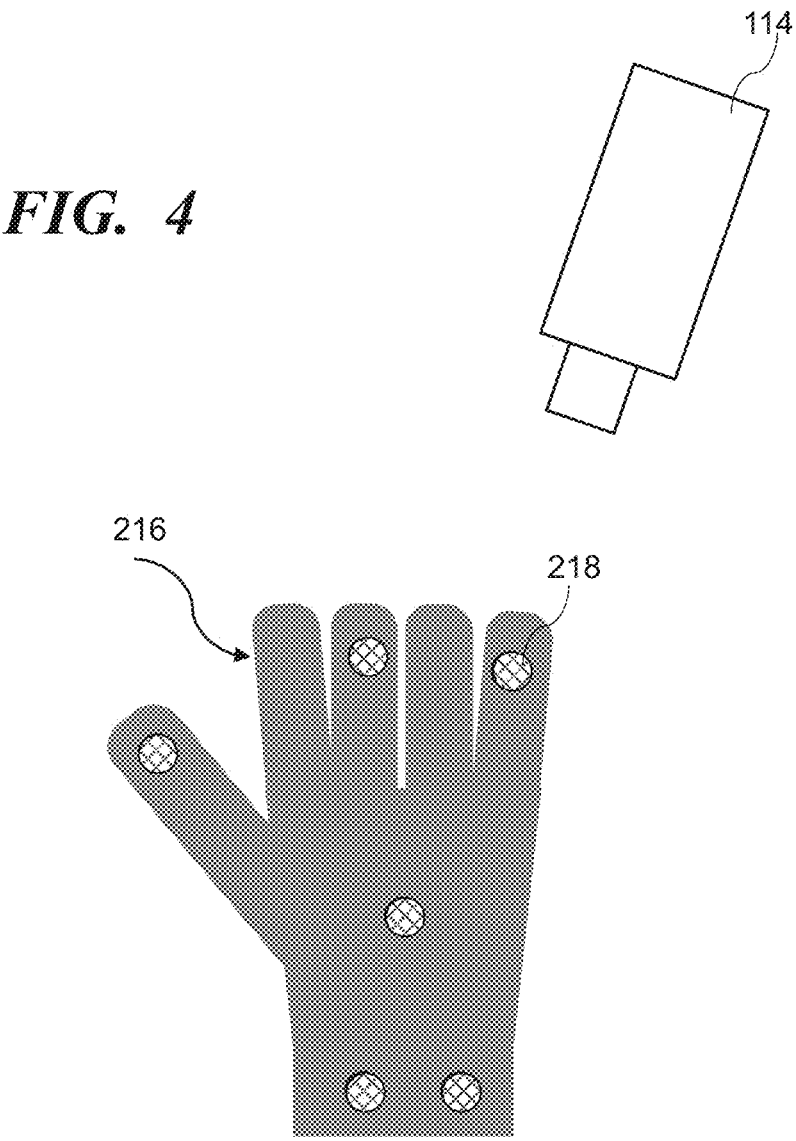
FIG. 4 is a schematic block diagram of portions of the system of FIG. 1.

FIG. 4 illustrates a single data glove 216 with a plurality of indicia 218 or dots in a pattern and this particular indicia design is associated with a particular worker. Thus, when the overhead image capturing device 114 captures an image with that indicia pattern, the control circuit can analyze the captured image and determine that the particular worker associated with those data gloves is shelving product at the captured location. Further, the product or inventory database 122 will have the particular worker associated with the product being shelved, and therefore, the control circuit 106 can determine the product being shelved by the worker and the location.

As suggested above, the control circuit 106 is configured to analyze the markings or indicia 218 on the gloves 216 in a captured image, such as via an image analysis tool 224 or post-capturing processing tool 232, to determine at what height a product is being shelved so that the control circuit can determine whether the store worker is stocking the particular product at a height corresponding to the intended shelf location for the particular retail product, according to the store planogram. For example, one of the database(s) 110, such as the image/video analytics database 126 may store information on the markings or indicia, such as the size, perspective, distribution or the appearance thereof at certain heights or distances from the image capturing device such that the control circuit 106 may access the database(s) 110 and analyze the captured image to determine the height at which the products are being shelved.

Further, the control circuit 106 is configured to send a notice of improper shelving upon a determination that the height at which the particular product is being shelved does not correspond or correlate to the intended shelf location for the particular product in the store planogram.

As noted above, the store workers may wear colors to indicate who is shelving the product such that the control circuit 106 or other image analysis tools can more easily identify the workers when processing the images. In addition, by having the worker in a particular color or other indicia, the post-capturing processing 232 or other image analysis tools may disregard captured images of individuals not wearing the particular color or other worker indicator.

Figure 3:
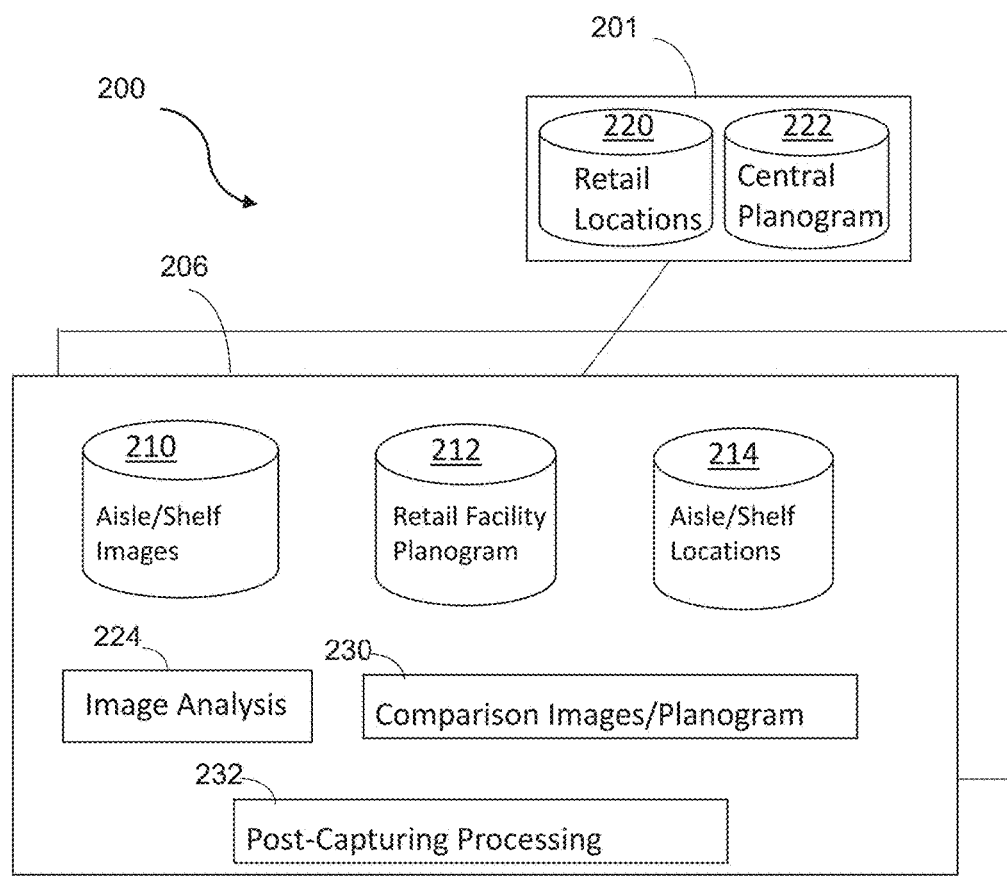
FIG. 3 is an exemplary image processing and product location system in accordance with some embodiments.

FIG. 3 illustrates one exemplary system 200 with a product server 206 (that may analyze and store information about retail products displayed and/or stocked within the retail shopping facility) that is in communication with a central planner or headquarters server 201. As suggested above, information about the location of retail products may be stored in the product server 206 and may be communicated to headquarters servers 201, which also may be in communication with similar servers from other retail locations.

By one approach, the headquarters server 201 that coordinates with several retail shopping facilities may have a database 220 of product locations in the retail facilities and also a central planogram 222 of how the headquarters server 201 intends the retail items to be shelved in the various retail facilities 112. In this manner, the headquarters server 201 can analyze the actual shelf location (or where the store worker is beginning to shelve the products, via the captured image) of retail items found in the database 220 and compare it with the planogram 222 to determine how accurately the associates or workers at a given store or retail shopping facility are organizing the facility. Also, the headquarters 201 can analyze the images of a given store's shelves over time to determine when and where workers have attempted to mistakenly shelve products.

As illustrated in FIG. 3, the product server 206 may include a database of overhead aisle images 210, a retail shopping facility planogram database 212 that may include images of intended aisle displays, and a database of aisle or shelf locations of retail items 214. Though the product server 206 is illustrated as having these databases within the server 206, these databases also may be stored outside of the server 206 and merely in communication with server 206.

In addition to a variety of databases, the product server 206 also may provide image analysis 224, post-capturing processing 232, and analysis or comparison 230 of captured images and the planogram. For example, once the product server 206 has received the captured electronic images 20, which are stored in the database 210, the images may undergo post-capturing analysis or processing 232, such as contrast enhancement or dynamic range reduction. Though the product server 206 is illustrated as providing these capabilities, these also may be provided by other servers or devices in communication with the product server 206.

As suggested above, a delivery vehicle 120 is unloaded after receipt at a retail shopping facility 112 and the products unloaded therefrom may be tracked from that point until they are shelved in their proper location, via the overhead electric image capturing devices. In one illustrative approach, the unloading occurs at a dock area of the retail facility 112. The products and workers handling these products are typically correlated with one another at the docki-area, and the relationship stored in one of the databases 110. In some embodiments, the delivery vehicle 120 has a vehicle planogram or manifest associated therewith, which may indicate the products in the shipment and in some cases even the location of those items in on the vehicle 120. In such configurations, the planogram or manifest is transferred to the control circuit 106 and the information therein may be used to correlate a particular product with a store worker handling the product. This may be supplemented by captured images of the dock area, such as a dock electronic image captured by one of the overhead electronic image captured devices located in the dock area, which would capture the associate handling the item and identify them via the markings or indicia on their data gloves 116. Accordingly, the control circuit 106 can associate or correlate the particular store worker and the product with one another in the product database.

The retail stock tracking system 100 also may include sensor(s) 134, such as optical sensors or a barcode reader, that may identify a product or a box as it is unloaded from a delivery vehicle or moved through the dock area. By one approach, the sensor(s) 134 (which, in some embodiments, may include a tunnel scanner) may be disposed at an exit of a delivery vehicle, such that the reader is configured to recognize the products being unloaded from the delivery vehicle via a product barcode and transmit that information to the control circuit 106. The scanned barcode information may be analyzed along with the dock electronic images captured to correlate or associate particular products with a store worker handling the product, and the control circuit 106 may store the association in one of the databases 110.

Figure 5:
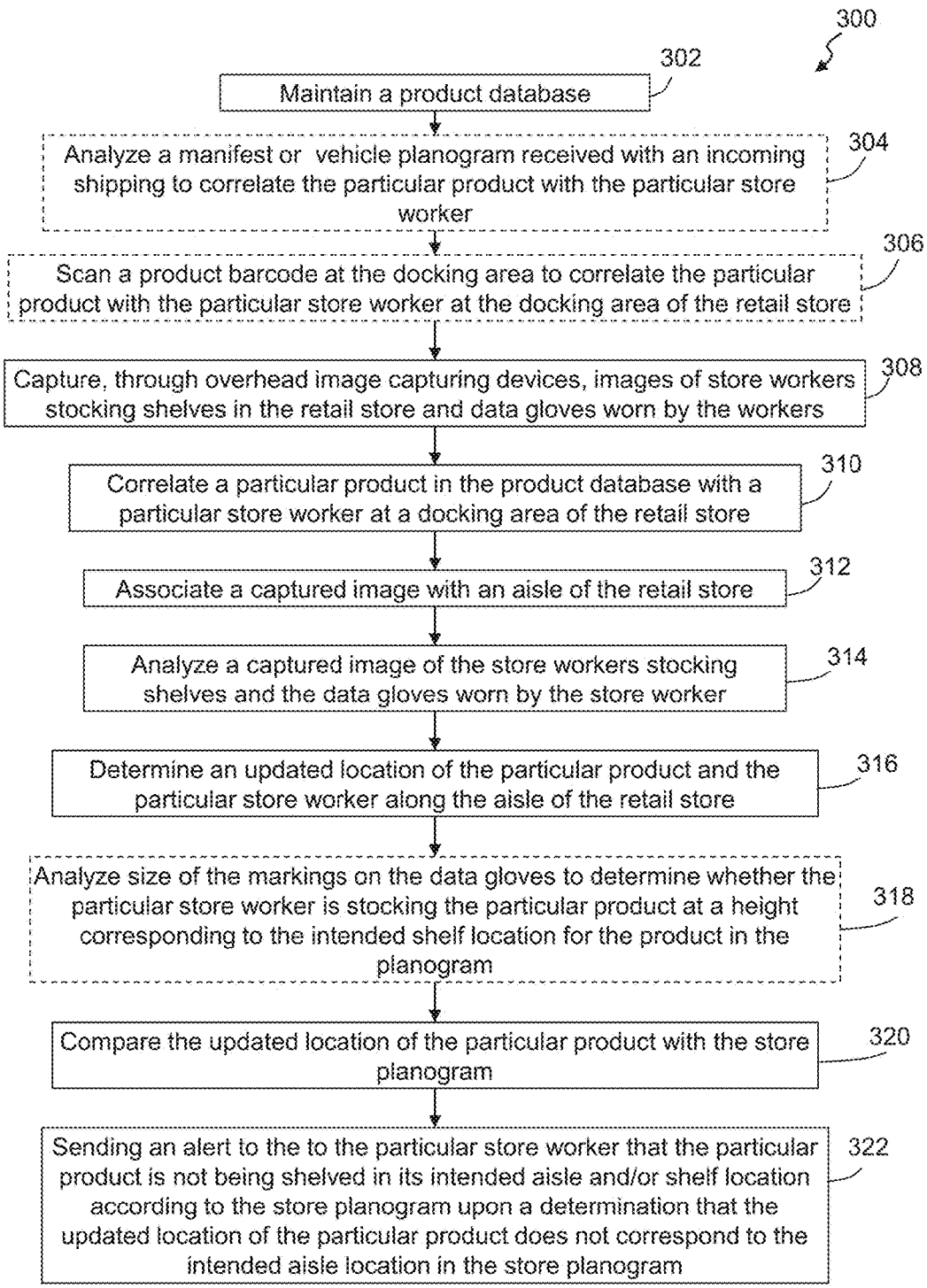
FIG. 5 illustrates an exemplary flow diagram in accordance with some embodiments.

In another exemplary embodiment, a method 300 is provided herein for tracking the products in a store to ensure proper shelf placement. By one approach, as shown in FIG. 5, the method 300 includes maintaining 302 a product database of retail items, aisle and/or shelf locations associated with at least some of the retail items, and a store planogram of intended aisle and/or shelf locations for the retail items. In some configurations, the method includes analyzing 304 a vehicle planogram received with an incoming shipment to correlate the particular product with the particular store worker at the docki area of the retail store and/or scanning 306 a product barcode at the dock area, via a sensor or barcode reader, to correlate the particular product with the particular store worker at the dock area of the retail store.

The method 300 also includes capturing 308 (via through overhead electronic image capturing devices) images of store workers stocking shelves in the retail store and data gloves having markings or indicia associated with particular store workers wearing the gloves and correlating 310 particular products in the product database with particular store workers at a dock area of the retail store. Further, the method 300 associates 312 a captured image with an aisle of the retail store, analyzes 314 the captured image of the store worker stocking shelves and their associated gloves, and determines 316 an updated, shelving location of the particular product and the particular store worker along the aisle of the retail store. The method also may associate 312 the captured images with aisle locations in the product database, for example, by referencing the particular image capturing device taking the image, identifying one or more aisle markers visible in the image to verify the aisle captured in the image, among other options. By one approach, this may include having markers noting the position of the worker along the aisle, such as shown in FIG. 2.

With this information, in step 320 (shown in FIG. 5), the method compares the updated location of the particular product with the store planogram and sends 322 an alert to the particular store worker (via a worker electronic device) that the particular product is not being shelved in its intended aisle location according to the store planogram, upon determining that the updated, shelving location of the particular product does not correspond to the intended aisle location of the particular product in the store planogram.

In another aspect, the method, in some configurations, analyzes 318 a size of the markings on the data gloves to determine whether the particular store worker is stocking the particular product at a height corresponding to the intended shelf location for the particular retail product in the store planogram. For example, the perspective and/or size of the markings may indicate a height location because, generally, the larger the markings on the gloves appear in a captured image, the higher the shelf located where the products are being placed.

Figure 6:
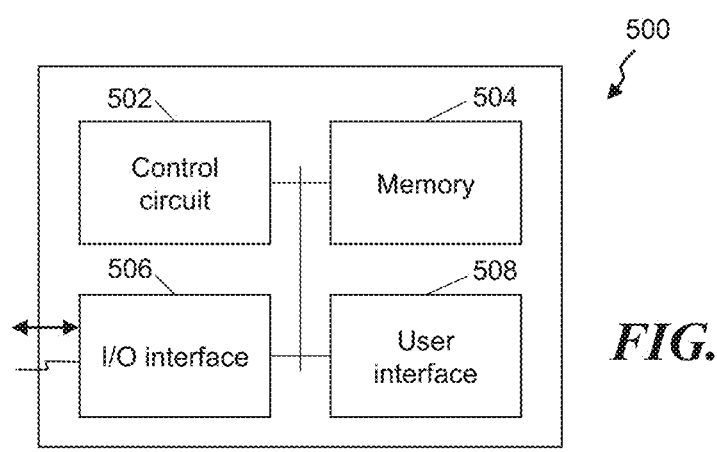
FIG. 6 illustrates an exemplary system for use in implementing systems, apparatuses, devices, methods, techniques and the like in monitoring retail products in a shopping space in accordance with some embodiments.

The methods, techniques, systems, devices, services, servers, sources and the like described herein may be utilized, implemented and/or run on many different types of devices and/or systems. Referring to FIG. 6, there is illustrated a system 500 that may be used for any such implementations, in accordance with some embodiments. One or more components of the system 500 may be used to implement any system, apparatus or device mentioned above, or parts of such systems, apparatuses or devices, such as for example any of the above or below mentioned control circuits, electronic user devices, sensor(s), databases, platforms, parts thereof, and the like. However, the use of the system 500 or any portion thereof is, certainly not required.

By way of example, the system 500 may include one or more control circuits 502, memory 504, input/output (I/O) interface 506, and/or user interface 508. The control circuit 502 typically comprises one or more processors and/or microprocessors. The memory 504 stores the operational code or set of instructions that is executed by the control circuit 502 and/or processor to implement the functionality of the systems and devices described herein, parts thereof, and the like. In some embodiments, the memory 504 may also store some or all of particular data that may be needed to deliver retail products outside of a retail facility.

It is understood that the control circuit 502 and/or processor may be implemented as one or more processor devices as are well known in the art. Similarly, the memory 504 may be implemented as one or more memory devices as are well known in the art, such as one or more processor readable and/or computer readable media and can include volatile and/or nonvolatile media, such as RAM, ROM, EEPROM, flash memory and/or other memory technology.

Further, the memory 504 is shown as internal to the system 500; however, the memory 504 can be internal, external or a combination of internal and external memory. The system 500 also may include a database (not shown in FIG. 5) as internal, external, or a combination of internal and external to the system 500. Additionally, the system typically includes a power supply (not shown), which may be rechargeable, and/or it may receive power from an external source. While FIG. 5 illustrates the various components being coupled together via a bus, it is understood that the various components may actually be coupled to the control circuit 502 and/or one or more other components directly.

Generally, the control circuit 502 and/or electronic components of the system 500 can comprise fixed-purpose hard-wired platforms or can comprise a partially or wholly programmable platform. These architectural options are well known and understood in the art and require no further description here. The system and/or control circuit 502 can be configured (for example, by using corresponding programming as will be well understood by those skilled in the art) to carry out one or more of the steps, actions, and/or functions described herein. In some implementations, the control circuit 502 and the memory 504 may be integrated together, such as in a microcontroller, application specification integrated circuit, field programmable gate array or other such device, or may be separate devices coupled together.

The I/O interface 506 allows wired and/or wireless communication coupling of the system 500 to external components and/or systems. Typically, the I/O interface 506 provides wired and/or wireless communication (e.g., Wi-Fi, Bluetooth, cellular, RF, and/or other such wireless communication), and may include any known wired and/or wireless interfacing device, circuit and/or connecting device, such as but not limited to one or more transmitter, receiver, transceiver, etc.

The user interface 510 may be used for user input and/or output display. For example, the user interface 510 may include any known input devices, such one or more buttons, knobs, selectors, switches, keys, touch input surfaces, audio input, and/or displays, etc. Additionally, the user interface 510 include one or more output display devices, such as lights, visual indicators, display screens, etc. to convey information to a user, such as but not limited to communication information, instructions regarding ordering or shelving products, status information, order information, delivery information, notifications, errors, conditions, and/or other such information. Similarly, the user interface 510 in some embodiments may include audio systems that can receive audio commands or requests verbally issued by a user, and/or output audio content, alerts and the like.

As outlined above, the teachings herein permit the retail tracking system to discern associates within a retail facility (even if other customers are therein) and track their movements. The system utilizes a number of cameras or overhead electronic image capturing devices that are potentially distributed throughout the store. For example, the associates or workers, in one embodiment, wear particular colored or patterned clothing so that the system, such as an image processing system, can discriminate between customers and workers. Further, the workers shelving products wear gloves with indicia or marking thereon, such as printed dots printed in a particular location, fashion, pattern, or array. In this manner, the system can detect where the worker is shelving or stocking product by identifying the worker on the captured electronic image based on their garment and the markings on their gloves. Further, the system, in some embodiments, scans the barcode on the box or product to determine if the worker is stocking the proper product for this location. In some configurations, the worker and the product are correlated prior to the worker being captured by the electronic image capturing device, such as when the worker is removing product from a delivery vehicle or at a dock area. Further, if necessary, the system is configured to issue alerts or notices to the worker if corrective action is needed.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A retail product tracking system for automatically tracking products unloaded from a delivery vehicle and shelved in a retail store, the retail product tracking system comprising:

a product database of retail items, aisle locations associated with at least some of the retail items, and a store planogram of intended aisle locations for at least some of the retail items;

overhead electronic image capturing devices disposed in a retail store, the overhead electronic image capturing devices configured to capture images of store associates stocking shelves in the retail store and data gloves worn by the store associates, the data gloves having markings associated with a particular worker wearing the data gloves;

a portable electronic device configured to be carried by a worker of the retail store; a barcode reader at an exit location of a delivery vehicle, the barcode reader configured to recognize a product being unloaded from the delivery vehicle via a product barcode; and a control circuit in communication with the product database and the overhead electronic image capturing devices, the control circuit configured to:

correlate a particular product in the product database with a particular store worker at a dock area of the retail store by receiving the product barcode from the barcode reader;

receive at least some of the captured images of the store aisles and associating the captured images received with an aisle of the retail store;

determine an updated location of the particular product and the particular store worker by analyzing one of the received captured images and a location of the particular store worker along the aisle of the retail store;

compare the updated location of the particular product with the store planogram; and upon determining that the updated location of the particular product does not correspond to location information in the store planogram, send an alert to the particular store worker, via the portable electronic device, that the particular product is not being shelved in its intended aisle location according to the store planogram.

2. The retail product tracking system of claim 1 wherein the control circuit is further configured to analyze the markings and a size of the markings on the data gloves to determine whether the particular store worker is stocking the particular product at a height corresponding to an intended shelf location for the particular retail product in the store planogram.

3. The retail product tracking system of claim 2 wherein the control circuit is further configured to send the worker electronic device a notice of improper shelving upon a determination that the height at which the particular product was being shelved does not correlate to the intended shelf location for the particular product in the store planogram.

4. The retail product tracking system of claim 1 wherein the overhead electronic image capturing devices capture images of multiple store aisles.

5. The retail product tracking system of claim 1 wherein the control circuit correlates the particular product in the product database with the particular store worker by analyzing a vehicle planogram received with an incoming shipment and a dock electronic image of the data gloves worn by the particular store worker, the dock electronic image captured by one of the overhead electronic image capturing devices located in the dock area.

6. The retail product tracking system of claim 5 wherein the control circuit associates the particular store worker and the particular product with one another in the product database.

7. The retail product tracking system of claim 1 wherein the barcode reader is a tunnel scanner.

8. The retail product tracking system of claim 7 wherein the control circuit correlates the particular product in the product database with the particular store worker by analyzing the dock electronic image captured by one of the overhead electronic image capturing devices located in the dock area and the product bar code transmitted from the barcode reader.

9. The retail product tracking system of claim 8 wherein the control circuit associates the particular store worker moving the particular product with the particular product in the product database.

10. The retail product tracking system of claim 1 wherein the database of retail items and the aisle locations indicate product placement information within a four-foot area.

11. The retail product tracking system of claim 1 wherein the overhead electronic image capturing device includes a memory configured to store at least some of the electronic images taken by a camera of the overhead electronic image capturing device and a power storage device.

12. The retail product tracking system of claim 11 wherein the electronic image capturing device further includes a transmitter configured to transmit at least some of the captured images to at least one of the control circuits, the product database, or a central computer.

13. The retail product tracking system of claim 1 wherein the overhead electronic image capturing devices are distributed throughout the retail store such that substantially all of the store aisles are within a camera view of at least one of the overhead electronic image capturing devices.

14. The retail product tracking system of claim 1 wherein the store workers are further indicated by a particular color garment to distinguish the store workers from customers and the control circuit is further configured to distinguish the store workers from the customers accordingly.

15. A method for tracking retail products as they are stocked in a retail store, the method comprising:
maintaining a product database of retail items, aisle locations associated with at least some of the retail items, and a store planogram of intended aisle locations for the retail items;
capturing, through overhead electronic image capturing devices disposed in a retail store, images of store workers stocking shelves in the retail store and data gloves worn by the store workers, the data gloves having markings associated with a particular worker wearing the data gloves;
correlating a particular product in the product database with a particular store worker at a dock area of the retail store;
associating at least some of the captured images with an aisle of the retail store;
analyzing one of the captured images of the store workers stocking shelves and the data gloves worn by the store worker;
determining an updated location of the particular product and the particular store worker along the aisle of the retail store;
comparing the updated location of the particular product with the store planogram; and
upon determining that the updated location of the particular product does not correspond to the intended aisle location of the particular product in the store planogram, sending an alert to the particular store worker, via a worker electronic device, that the particular product is not being shelved in its intended aisle location according to the store planogram.

16. The method of claim 15 further comprising analyzing a size of the markings on the data gloves to determine whether the particular store worker is stocking the particular product at a height corresponding to an intended shelf location for the particular retail product in the store planogram.

17. The method of claim 15 further comprising analyzing a vehicle planogram received with an incoming shipment to correlate the particular product with the particular store worker at the dock area of the retail store.

18. The method of claim 15 further comprising scanning a product barcode at the dock area, via a barcode reader, to correlate the particular product with the particular store worker at the dock area of the retail store.

* * * * *